US005539957A

United States Patent [19]

Schmidt

[11] Patent Number: 5,539,957

[45] Date of Patent: Jul. 30, 1996

[54] COLLAPSIBLE GOAL HAVING AN ARTICULATED FRAME

[76] Inventor: Todd W. Schmidt, 2532 Ellen Ave., Fort Wayne, Ind. 46808

[21] Appl. No.: 328,116

[22] Filed: Oct. 24, 1994

[51] Int. Cl.[6] .............................. E05D 11/10; F16C 11/00

[52] U.S. Cl. ................................ 16/331; 16/319; 16/324; 16/254; 403/102; 5/99.1; 5/93.1

[58] Field of Search .............................. 16/331, 319, 324, 16/254, 260, 270, 271; 403/102; 5/99.1, 98.1

[56] References Cited

U.S. PATENT DOCUMENTS

| | | | |
|---|---|---|---|
| 2,549,573 | 4/1951 | Clark | 403/102 |
| 2,794,357 | 6/1957 | Lykins | 403/102 |
| 3,380,767 | 4/1968 | Barth | 403/102 |
| 3,563,592 | 2/1971 | Preston | 403/102 |

*Primary Examiner*—M. Rachuba
*Assistant Examiner*—Adesh Bhargava
*Attorney, Agent, or Firm*—Roger M. Rickert

[57] ABSTRACT

A mesh net supporting framework for a hockey goal which is readily collapsed for transportation or storage has elongated tubular members hinged together at their respective ends and locking mechanisms at those hinges for securing the tubular members in mutually perpendicular configurations. The locking mechanisms may comprise an elbow with one of the tubular members and a short tube extending therefrom perpendicular to one another. There is an abutment on the short tube, and a cylindrical cuff surrounds the other of the tubular members, with that cuff having a semicylindrical extension for engaging the abutment. The other tubular member also has a semicylindrical end portion for engaging the abutment. Relative angular movement of the tubular members is precluded when the semicylindrical end and the semicylindrical extension are misaligned, while the tubular members are relatively angularly movable when the semicylindrical end and the semicylindrical extension are positioned adjacent the same semicircular portion of the abutment. The locking mechanisms are freed to collapse the goal by rotating the cuff through about one hundred eighty degrees about the other tubular member.

7 Claims, 5 Drawing Sheets

COLLAPSIBLE GOAL HAVING AN ARTICULATED FRAME

SUMMARY OF THE INVENTION

The present invention relates generally to sports goals and more especially to a relatively large goal structure which is readily collapsed for transportation or storage.

There have been numerous attempts to reduce the overall size of such a goal structure to enable it to be transported or stored. For example, U.S. Pat. No. 3,501,150 teaches a series of separable tubular sections assembled to form a hockey goal. These tubular sections may telescopically connect when assembled. The object of this patent is to reduce (it does not eliminate) the amount of lacing of the net to the frame which is required when the goal is assembled for use. A recent commercial hockey goal utilizes shockcorded separable tubular sections.

U.S. Pat. Nos. 3,501,150 and 8,698,715 disclose collapsible goals, but these arrangements collapse in one dimension only. For example, a 3'×4'×5' goal may collapse to 4"×4'×5'. While flat, a 4'×5' structure is quite difficult to get, for example, into an automobile trunk for transportation. Each of these two patented devices requires some preliminary dis-assembly, such as the removal of diagonal braces or wing nuts.

Among the several objects of the present invention may be noted the provision of a collapsible goal structure which collapses in two dimensions; the provision of a collapsible goal structure which collapses without dis-assembling or removing any component part, the provision of an articulated tubular structure suitable, for example, as a frame for a collapsible goal; and the provision of a lockable hinge for joining tubular members and useful, for example, for forming an articulated tubular structure. These as well as other objects and advantageous features of the present invention will be in part apparent and in part pointed out hereinafter.

In general, while the prior art collapses a goal structure in one dimension only, the present invention materially reduces two of the three dimensions so as to occupy no more space than a conventional golf bag.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
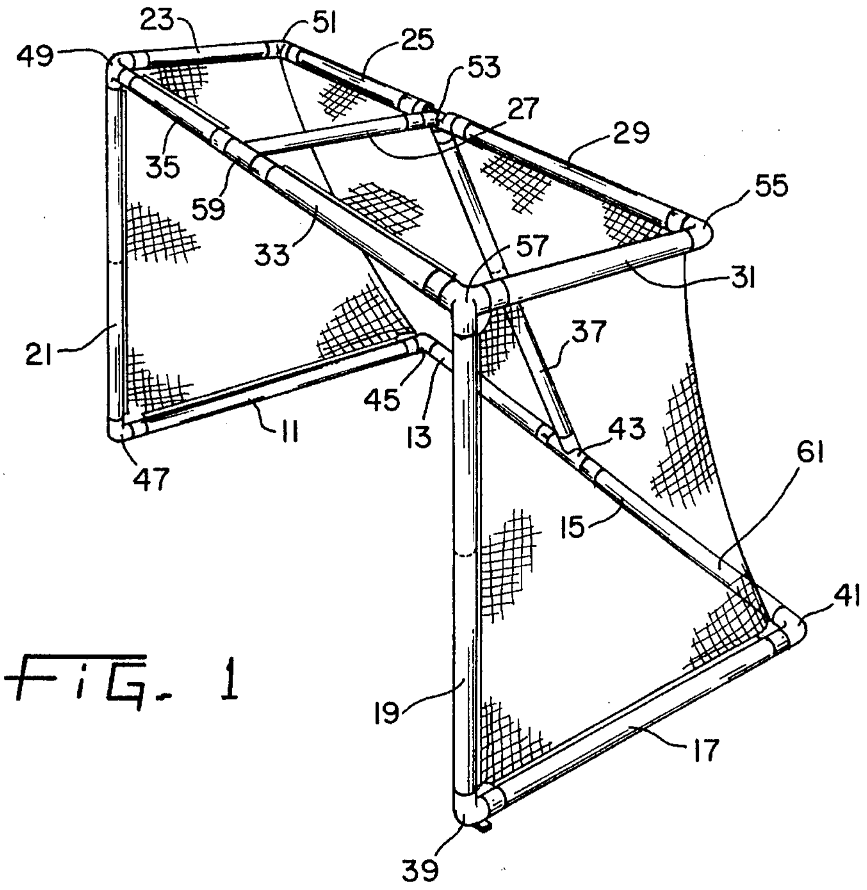
FIG. 1 is a perspective view of a collapsible sports goal in its fully expanded configuration, ready for use.

In an illustrative preferred embodiment, a collapsible hockey goal is shown in FIG. 1 in its fully expanded configuration an oriented in position ready for use. The collapsible goal assembly includes the articulated elongated members 11, 13, 15, 17, 19, 21, 23, 25, 27, 29, 31, 33, 35 and 37. In a preferred form, each of these fourteen elongated members is a hollow polyvinylchloride (PVC) tube of one to two inches in diameter. The elongated members are hingedly interconnected at their respective ends by a number of couplers 39, 41, 43, 45, 47, 49, 51, 53, 55, 57 and 59 to facilitate movement of the assembly between expanded and collapsed configurations. It will be noted that couplers 43, 49, 57 and 59 each serve to couple three elongated tubes together. There are four elongated tubes coupled together at 53. The remaining six couplers all interconnect exactly two elongated members. Thus, an even number of couplers (four in this case) interconnect an odd number (three in this case) of members and the remaining couplers interconnecting an even number (either two or four) of members.

Figure 5:
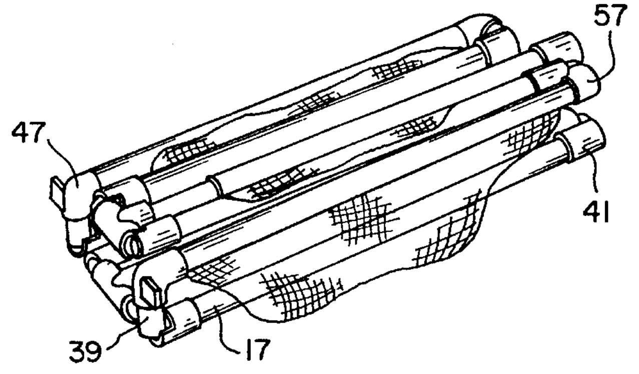
FIG. 5 is a perspective view of the goal of FIG. 1 in its final collapsed condition.

The elongated members 19, 21, 23, 27, 31 and 37 are adapted to telescopically extend and retract while the remaining eight elongated members are fixed in length. Three of the six telescoping members, namely the uprights 19, 21 and 37 are extended when the goal assembly is expanded as in FIG. 1, and are retracted when the goal assembly is collapsed as in FIG. 5. These three uprights may include a latching mechanism such as the one illustrated in FIG. 14 to maintain them extended during use. The remaining three, 23, 27 and 31 are extended when the goal assembly is collapsed and is retracted when the goal assembly is expanded as shown and, typically, no latching mechanism is used.

Figure 14:
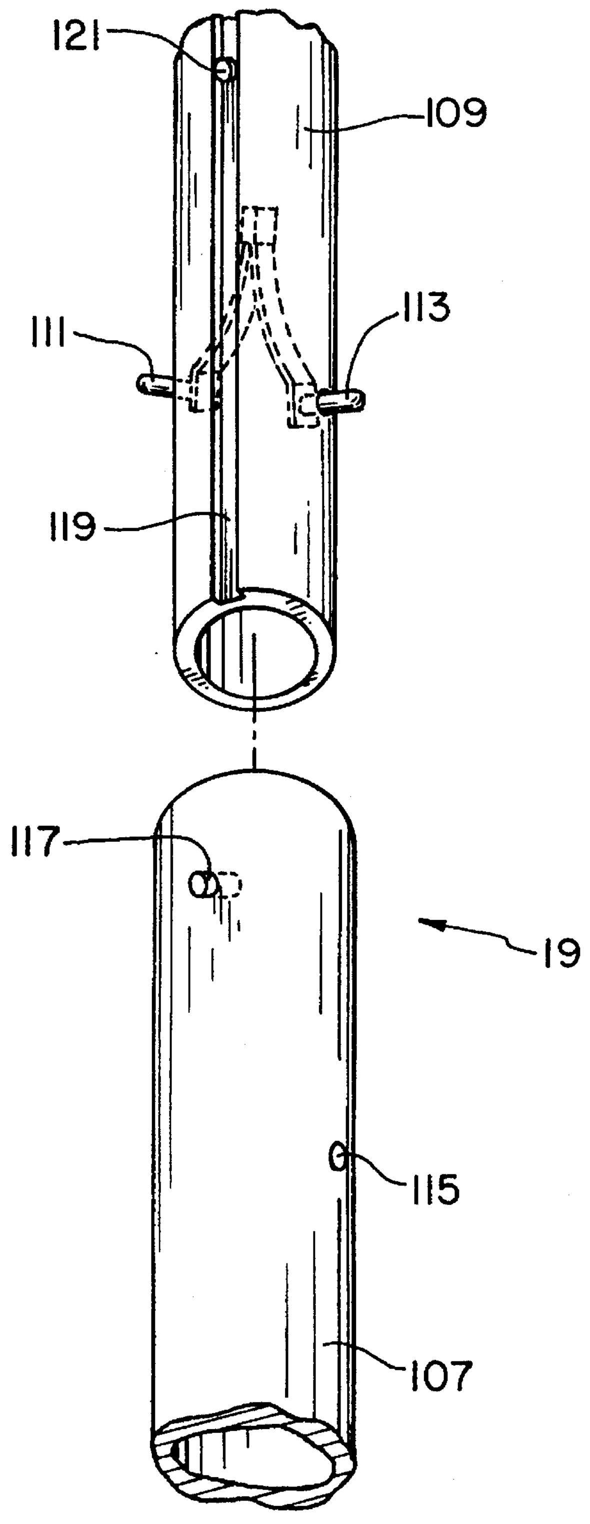
FIG. 14 is an exploded isometric view of a pair of telescoping tubular members with alignment and locking features.

The latching mechanism of FIG. 14 couples two telescopically engaged tubes 107 and 109 which together form the upright member 19, for example, and includes a pair of spring-loaded pins 111 and 113 which lock into holes such as 115 when the two tubes 107 and 109 are relatively extended. An interior pin or boss 117 may slide in slot 119 and engage pin 121 to limit extension of member 19 and to maintain angular alignment between tubes 107 and 109 so that pins 111 and 113 properly align with their respecive holes 115.

A somewhat conventional flexible fabric mesh net 61 has peripheral portions of net material or a fabric border slidingly, permanently encircling certain of the elongated members. This is so the net can slide somewhat on the elongated tubes during collapsing and expansion of the goal. Tubes 11, 17, 19, 21, 33 and 35 receive such peripheral net portions. There are also fabric ties or tubes which slidingly permanently connect interior regions of the net and the four members 23, 25, 29 and 31. It will be recalled that exactly six members telescopically extend and retract while the remaining members are fixed in length. Net peripheral portions permanent encircle exactly four those six members.

Figure 6:
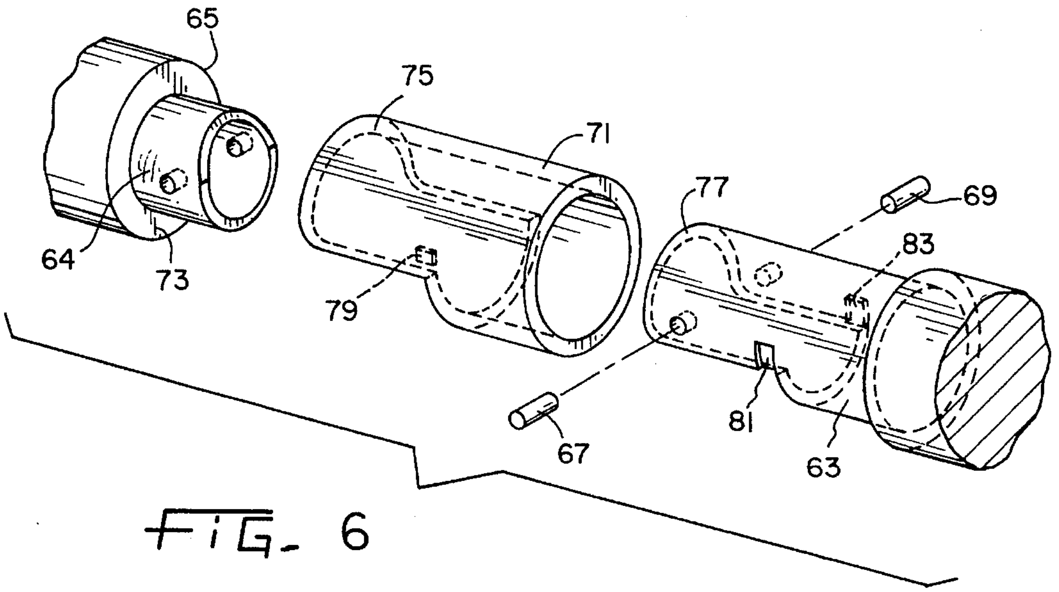
FIG. 6 is an exploded isometric view of a lockable hinge structure for pivotably joining two tubular members.

Skipping to FIG. 6, a lockable hinge mechanism is shown in an exploded isometric view and is seen to include a pair of tubular members 63 and 65 having respective ends pivotably joined as by fixed or spring loaded pins 67 and 69 for movement between generally orthogonal (FIG. 8) and collinear (FIGS. 7 and 9) relative positions. A locking mechanism including the cuff 71 is selectively operable to the position shown in FIG. 9 to prevent relative movement of the tubular members from the collinear position to the orthogonal position. The locking mechanism also includes an abutment 73 on tubular member 65. The cylindrical cuff 71 surrounds the other tubular member 63 and has a semicylindrical extension 75 for engaging the abutment 73. The other tubular member 63 also has a semicylindrical end portion 77 for engaging the abutment 73. The abutment is generally circular in cross-section and comprises a radially outward cylindrical enlargement which surrounds tubular member 65.

Figure 7:
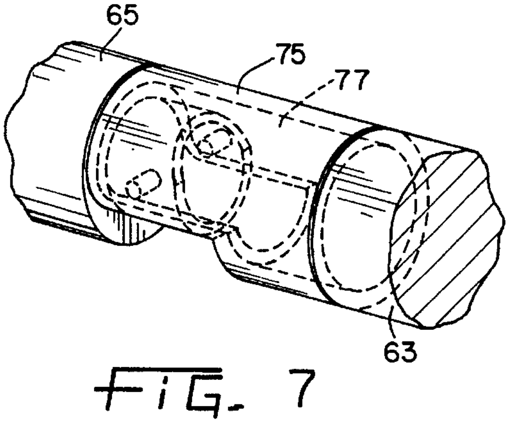
FIG. 7 is an isometric view of the hinge structure of FIG. 6 in its unlocked state with the tubular members collinear.
Figure 8:
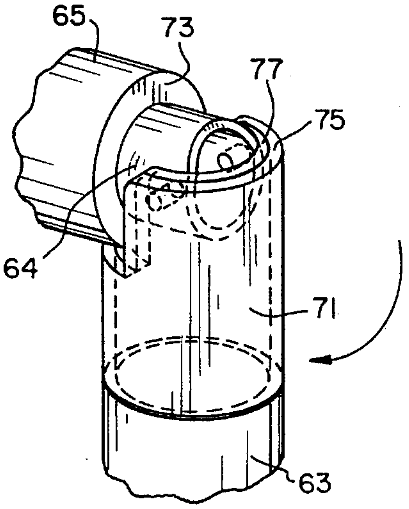
FIG. 8 is an isometric view of the hinge structure of FIG. 6 with the tubular members relatively pivoted to a perpendicular position.
Figure 9:
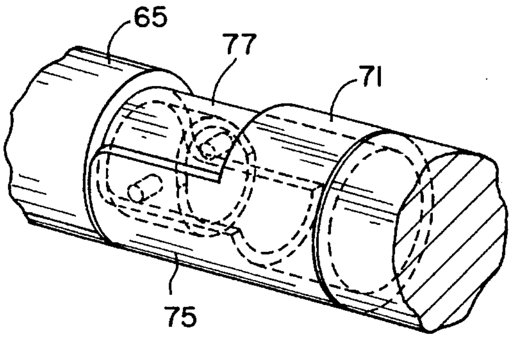
FIG. 9 is an isometric view of the hinge structure of FIG. 6 in its locked state with the tubular members collinear.

FIG. 9 shows that relative angular movement of the tubular members 63 and 65 is precluded when the semicylindrical end and the semicylindrical extension are misaligned. A radially inwardly projecting boss or pin 79 selectively engages slot ends 81 or 83 so that the cylindrical cuff 71 and tubular member 63 are relatively coaxially rotatable through a range of about 180 degrees to align or completely misalign the semicylindrical end and semicylindrical portion. Of course, the boss could be located on member 63 and the slot located near the end of cuff 71 if desired. Detents or bumps may be provided to hold the cuff in its extreme positions. FIG. 7 and 8 show that the tubular members are relatively movable about the pivot pins 67 and 69 when the semicylindrical end and the semicylindrical extension are aligned and positioned adjacent the same semicircular portion of the abutment as in FIG. 7. Typically, the cuff semicylindrical portion extends through slightly more than one hundred eighty degrees and the member 65 may be undercut slightly in the regions 64 to avoid binding or flexing of the cuff when folded to the position of FIG. 8.

Figure 13:
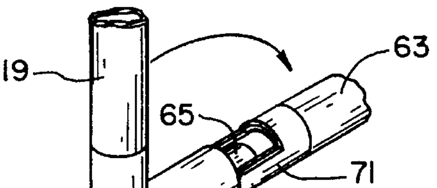
FIG. 13 is an isometric view of a lockable hinge structure for pivotably joining two elongated tubular members.

Tubular members 63 and 65 are locked in a collinear configuration as in FIG. 9 while locking of the elongated members such as 17 and 19 of FIG. 1 must be in the mutually perpendicular position. Reference to FIG. 13 will resolve this conflict. Tube 65 may be a relatively short tubular portion extending from a ninety degree elbow 85 to which an elongated tubular member such as 19 is attached. Thus, elongated tubular member 19 is a third tubular member and elbow 85 rigidly connects the one short tubular member 65 and the third tubular member 19 in an orthogonal relationship. The elbow itself may function as the circular abutment 73. In FIG. 13, the selectively operable cuff arrangement precludes relative movement of the third tubular member 19 and other tubular member 63 from a relatively orthogonal position as shown to a relatively parallel position.

Figure 11:
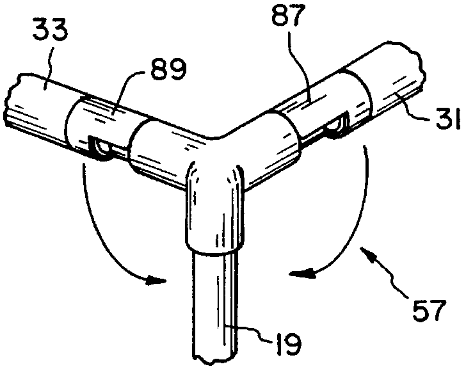
FIG. 11 is an isometric view of a lockable hinge structure for pivotably joining three mutually orthogonal elongated tubular members.
Figure 12:
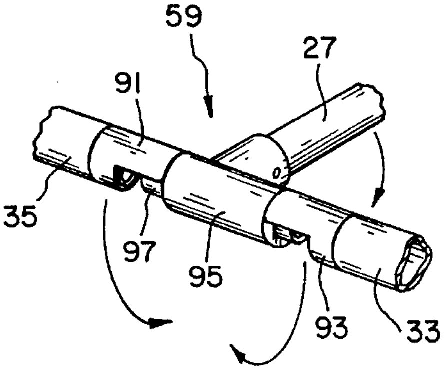
FIG. 12 is an isometric view of a lockable hinge structure for pivotably joining three elongated tubular members.

More complex couplings are also possible. In FIG. 11, a lockable hinge mechanism, for example, coupling 57 of FIG. 1 has three elongated tubular members 19, 31 and 33 have their respective ends pivotably joined for movement between generally parallel and mutually orthogonal relative positions. There are selectively operable cuffs 87 and 89 associated with two of the elongated tubular members which are operable as described in conjunction with FIGS. 6–9 to prevent relative movement of the elongated tubular members from the mutually orthogonal position to the parallel position.

Three elongated tubular members such as 27, 33 and 35 having respective ends pivotably joined for movement between a first configuration as shown in which two of the elongated tubular members 33 and 35 are collinear and the third 27 is generally perpendicular to the first two. With cuffs 91 and 93 properly positioned in their unlocked condition, tubular members 33 and 35 may be pivoted to a second configuration in which the three elongated tubular members are generally parallel to one another. With the cuffs 87 and 89 in the locked position (tubes 33 and 35 in the collinear position), relative movement of the elongated tubular members from the first configuration to the second configuration is prevented. While a third cuff locking arrangement could be associated with tube 27, the short tube 97 to which the members 33 and 35 are pivotably attached, may simply be free to rotate within the T 95 allowing tube 27 to be pivoted to a position parallel with the other two tubular members in the collapsed condition.

Figure 10:
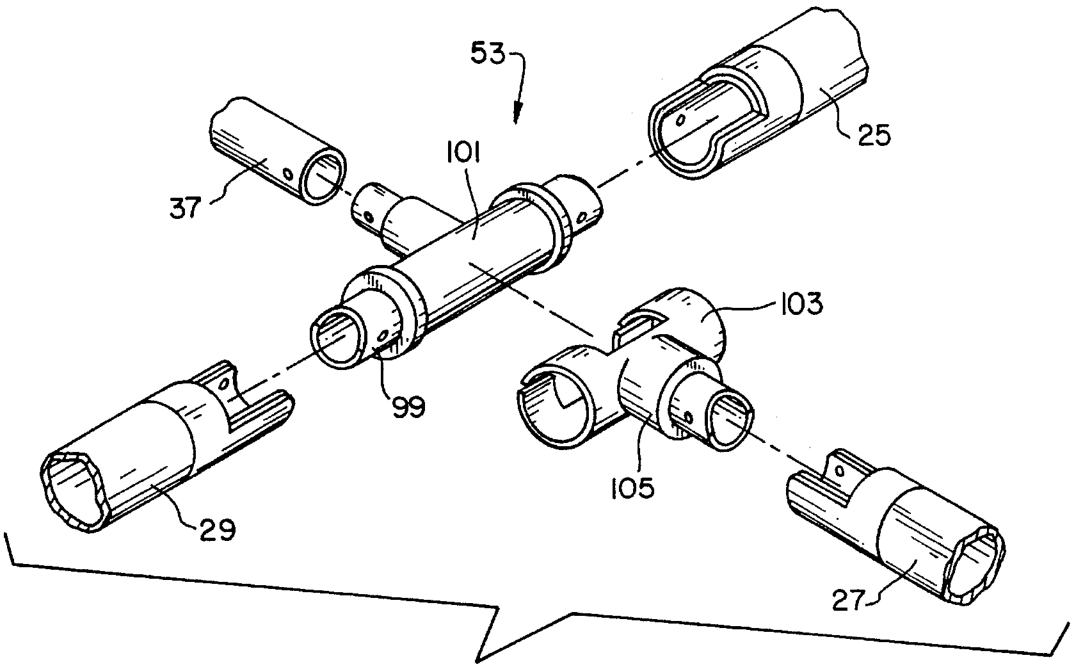
FIG. 10 is an exploded isometric view of a lockable hinge structure for pivotably joining four elongated tubular members.

Coupler 53 is shown in an exploded view in FIG. 10. For convenience of explanation, this coupler is up side down from the position it occupies in FIGS. 1–4. Like T 95 slidably surrounds tube 97, the short tube 99 is free to rotate within the T 101. The straight outer section of T 101 is, in turn, free to rotate within sleeve 103 of another T 105. Such an arrangement eliminates the need for a fourth cuff locking arrangement for tube 37.

Figure 2:
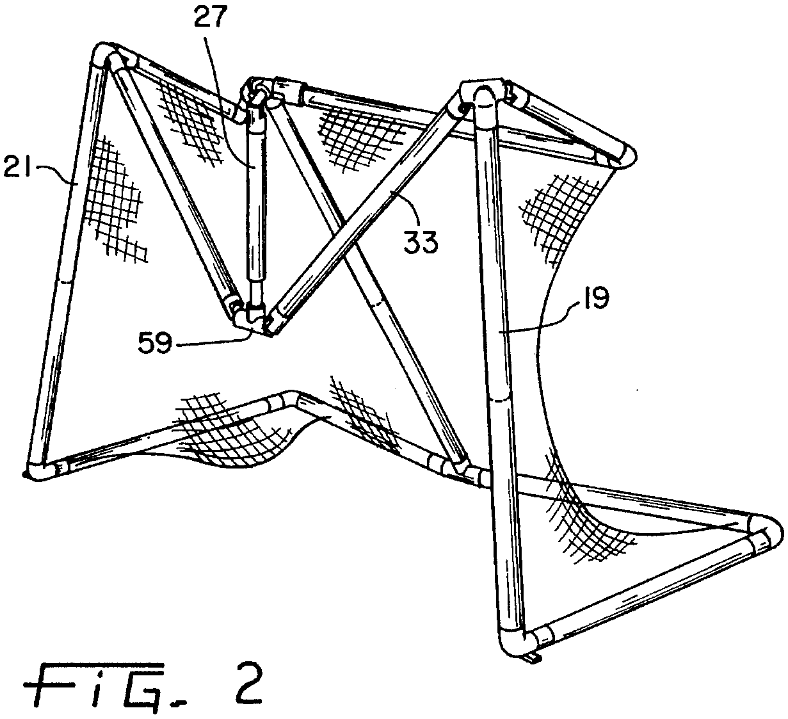
FIG. 2 is a perspective view of the goal of FIG. 1 with collapsing just commencing.
Figure 3:
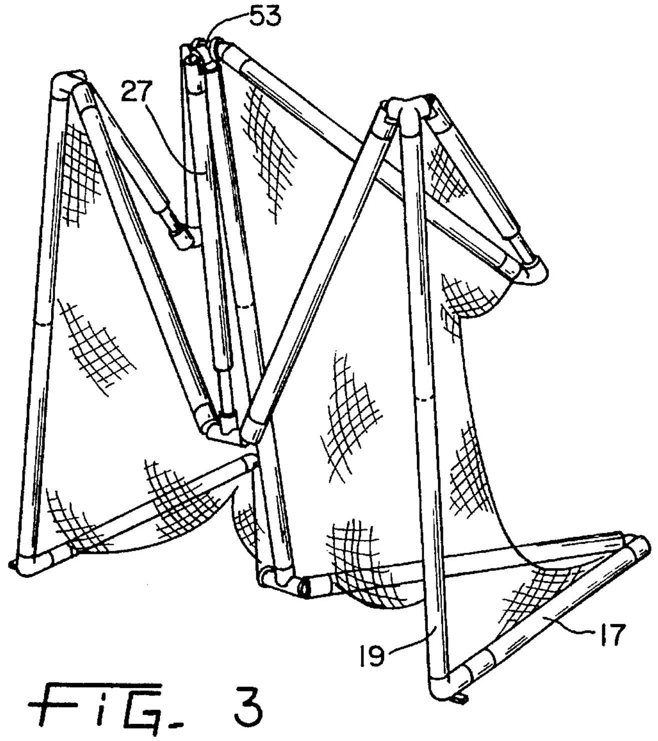
FIG. 3 is a perspective view of the goal of FIGS. 1 experiencing further collapsing and telescopic extension of three tubular members.
Figure 4:
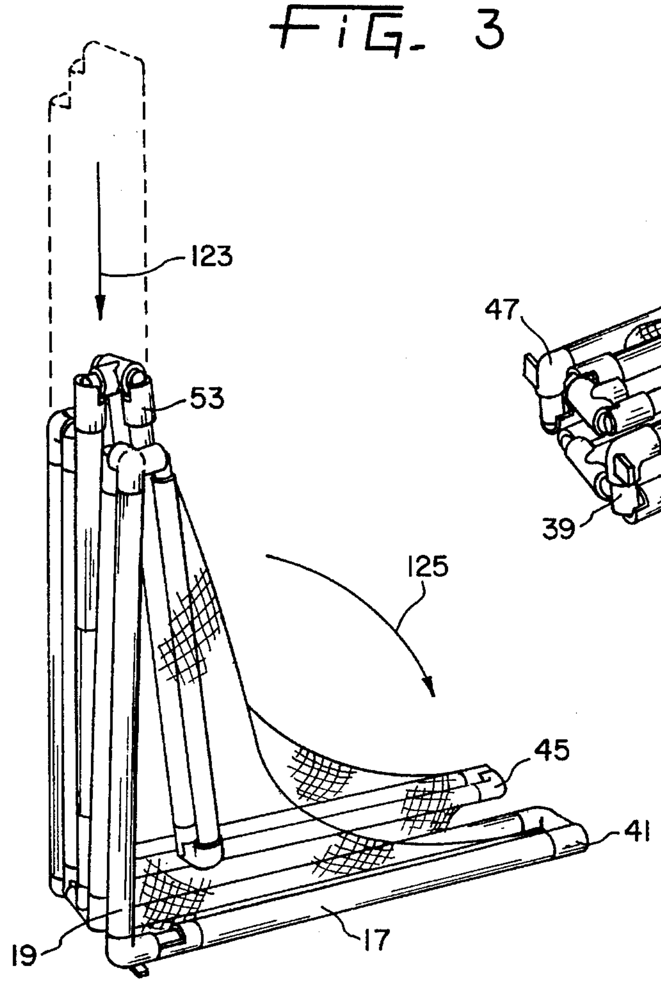
FIG. 4 is a perspective view of the goal of FIG. 1 after telescopic retraction of three tubular members with final folding ready to commence.

The method of operation of the invention should now be clear. To collapse the goal from the configuration of FIG. 1, all locking cuffs are rotated to the unlocked position of FIG. 7. Uprights 19 and 21 are leaned toward one another and the coupler 59 moved downwardly as seen in FIG. 2. Members 23, 27 and 31 begin to experience extension at this time. FIG. 3 illustrates further extension of members 23, 27 and 31. The member 27 may comprise three telescoping tubes while two telescoping tubes is typically adequate for members 23 and 31. Also, in FIG. 3, rear lower members 13 and 15 begin to fold toward one another, and the corner couplers 51 and 55 are lowering. As the couplers 51 and 55 are lowered, the members 23 and 31 telescopically extend somewhat since members 25 and 29 are somewhat longer than members 23 and 31. In FIG. 4, the telescoping uprights 19, 21 and 37 are collapsing as shown by arrow 123, and couplers 39, 43 and 47, next experience ninety degree rotation to allow pivotal movement indicated by arrow 125 to the completely collapsed condition of FIG. 5. Comparing FIGS. 1 and 5, it is clear that in the collapsed configuration, all the elongated members are disposed generally parallel to one another while in the expanded configuration, those members are generally perpendicular to one another where they meet at a coupler. The sole exception is that members 27 and 37 are more nearly at one hundred twenty degrees to one another although each is perpendicular to members 27 and 29. Thus, with the exception of one member, all members are perpendicular to the others at a common coupler.

From the foregoing, it is now apparent that a novel collapsing goal arrangement has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A lockable hinge mechanism comprising a pair of tubular members having respective ends pivotably joined for movement between generally orthogonal and collinear relative positions, and selectively operable means for precluding relative movement of the tubular members from the collinear position to the orthogonal position, the selectively operable means comprising an abutment on one of the tubular members, and a cylindrical cuff surrounding the other of the tubular members, said cuff having a semicylindrical extension for engaging the abutment and the other tubular member having a semicylindrical end portion for engaging the abutment.

2. The lockable hinge mechanism of claim 1 wherein the abutment is generally circular, relative movement of the tubular members being precluded when the semicylindrical end and the semicylindrical extension are misaligned, while the tubular members are relatively movable when the semicylindrical end and the semicylindrical extension are positioned adjacent the same semicircular portion of the abutment.

3. The lockable hinge mechanism of claim 1 wherein the abutment comprises a radially outward cylindrical enlargement surrounding said one tubular member.

4. The lockable hinge mechanism of claim 1 further including a third tubular member and an elbow rigidly connecting said one tubular member and the third tubular member in an orthogonal relationship, the selectively operable means precluding relative movement of the third tubular member and said other tubular member from a relatively orthogonal position to a relatively parallel position.

5. The lockable hinge mechanism of claim 1 wherein the cylindrical cuff and said other tubular member are relatively coaxially rotatable through a range of about 180 degrees.

6. A lockable hinge mechanism comprising three elongated tubular members having respective ends pivotably joined for movement between generally parallel and mutually orthogonal relative positions, and selectively operable means associated with two of the elongated tubular members for precluding relative movement of the elongated tubular members from the mutually orthogonal position to the parallel position.

7. A lockable hinge mechanism comprising three elongated tubular members having respective ends pivotably joined for movement between a first configuration in which two of the elongated tubular members are collinear and the third is generally perpendicular to the first two and a second configuration in which the three elongated tubular members are generally parallel to one another, and selectively operable means associated with at least two of the elongated tubular members for precluding relative movement of the elongated tubular members from the first configuration to the second configuration.

* * * * *